A. B. PLACE.
Coffee-Pot.

No. 204,995. Patented June 18, 1878.

WITNESSES:
C. Neveux
C. Sedgwick

INVENTOR:
A. B. Place
BY Munn & Co.
ATTORNEYS.

UNITED STATES PATENT OFFICE.

ARMSTRONG B. PLACE, OF DENVER, COLORADO.

IMPROVEMENT IN COFFEE-POTS.

Specification forming part of Letters Patent No. 204,995, dated June 18, 1878; application filed May 23, 1878.

*To all whom it may concern:*

Be it known that I, ARMSTRONG B. PLACE, of Denver, in the county of Arapahoe and State of Colorado, have invented a new and Improved Coffee-Pot, of which the following is a specification:

My invention consists in a novel construction of a vessel for holding the ground coffee and straining the liquid, and a vessel for arresting any fine grounds or settlings which may escape from the first vessel, and for still further straining the liquid, and the combination and arrangement of said two vessels with relation to each other and to an outer vessel, pot, or boiler, whereby several advantages are obtained, as hereinafter particularly described and set forth.

The invention may be used in connection with a pot or boiler of any suitable description; but its efficiency is enhanced when used in a vessel in which it fits nicely.

Figure 1:
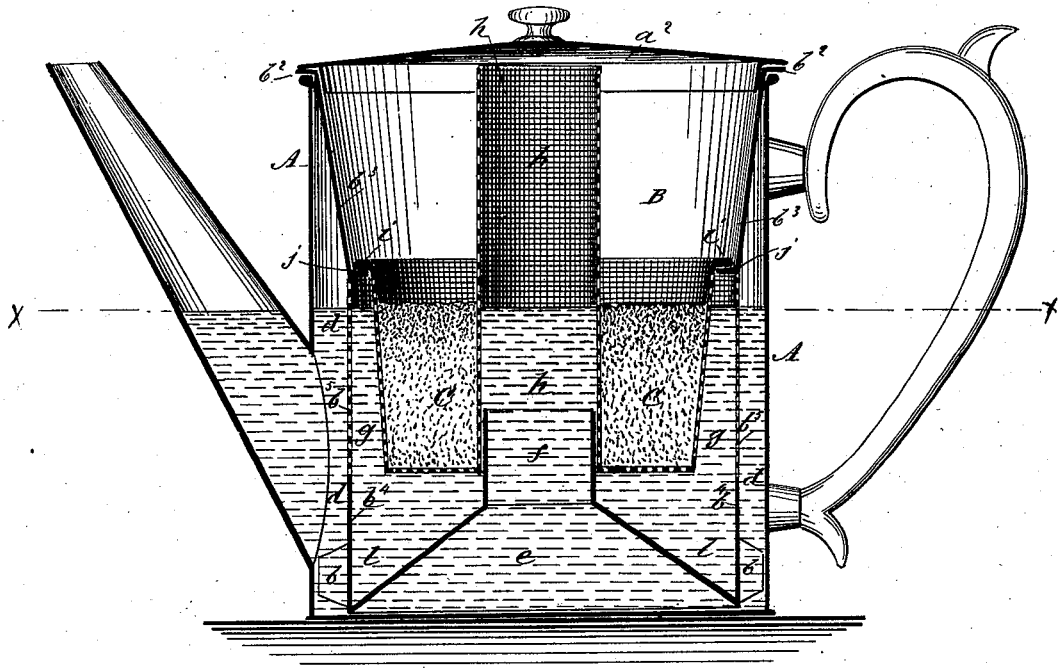
Figure 2:
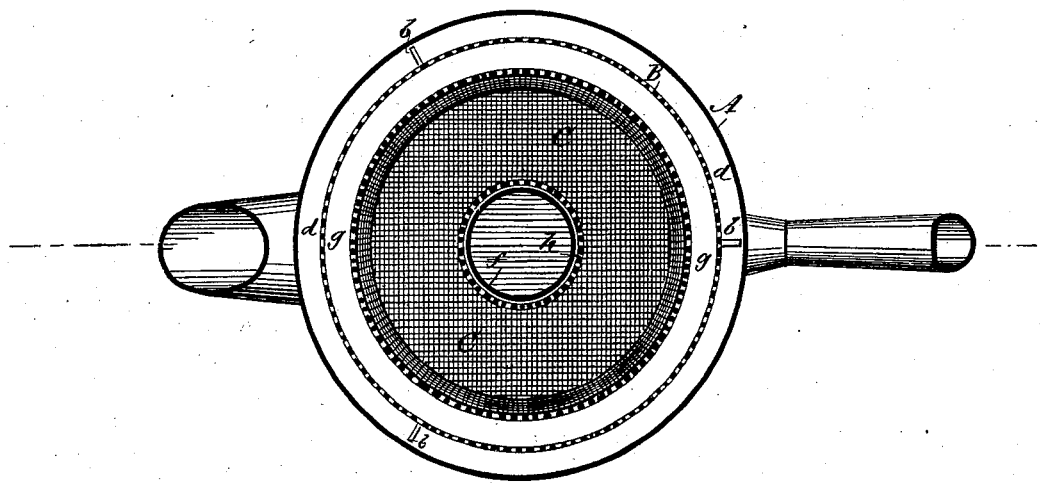

The accompanying drawing represents a complete apparatus embodying my improvements, Figure 1 being a central vertical section, and Fig. 2 a horizontal section in the line $x$ $x$ of Fig. 1.

Similar letters of reference indicate corresponding parts.

A represents a coffee-pot of ordinary construction. B is a vessel resting in the pot A, and C a vessel resting in the vessel B. The vessel B is of similar shape to the coffee-pot, but smaller, so that when in place there is an annular chamber, $d$, between the coffee-pot and the vessel B, which is provided with lugs $b$, for holding it steadily in place.

The upper edge of the vessel B is turned outward into a rim or flange, $b^2$, fitting nicely over the edge of the pot A, to prevent the escape of aroma, and receiving the lid $a^2$ of the coffee-pot. The bottom of the vessel B is in the shape of an inverted funnel, and, with the bottom of the coffee-pot, forms a conical chamber, $e$, terminating in a short tube, $f$, in the center. From the conical bottom the sides of the vessel B extend vertically for somewhat more than half the height thereof, and are thence inclined outward, so as to fit the upper end of the coffee-pot. This inclined upper portion $b^3$ and a somewhat narrower portion, $b^4$, extending upward from the bottom, are of solid sheet metal, and the portion $b^5$ between them is of perforated sheet metal or wire-gauze.

The vessel C is made entirely of perforated sheet metal or wire-gauze. Its diameter is less than that of the vessel B, so as to form an annular chamber, $g$, between it and said vessel, and its depth is equal to about one-third of the height of said vessel. It is provided with a central tube, $h$, fitting over the short tube $f$ of the vessel B, and of a height equal to about twice the depth of the vessel C, so that when in place the tube extends upward about as high as the top edge of the vessel B. The top edge of the vessel C has an outwardly-turned flange, $i$, which rests on an inwardly-extending flange, $j$, in the vessel B, and serves the double purpose of preventing the vessel C from falling too low, and also preventing the escape of liquid from the annular chamber $g$, or of ground coffee from the vessel C.

The parts being in the position shown in Fig. 1, the ground coffee is placed in the vessel C, boiling water is poured down the central tubes $h$ $f$ in the desired quantity, and the apparatus placed over the fire, and the water allowed to boil a few minutes. As the water boils, the conical shape of the chamber $e$ causes the water to pass upward through the tube $f$, and a current is established which extends through the perforated tube $h$, through the ground coffee in the cup C, and through the annular chambers $g$ and $d$ to the conical chamber $e$. As the water passes through the ground coffee in the cup C it extracts the strength therefrom so quickly, owing to the ample extent of perforated surface, that the flavor is not at all impaired. Any fine grounds which may be forced out through the perforations in the cup C will fall into and be arrested by the annular trough $l$, formed by the conical bottom of the vessel B and the solid portion $b^4$ of its sides, so as to keep the liquid coffee contained in the annular chamber $d$ perfectly clear, and prevent any grounds or muddy liquid from being poured through the spout into the cups.

If desired, the cup or vessel C may be removed after the strength is extracted from the coffee, leaving only the liquid coffee remaining in the apparatus.

Having thus fully described my invention, I claim as new and desire to secure by Letters Patent—

1. The vessel B, having the conical bottom forming the chamber $e$, the central tube $f$, the solid sheet-metal upper and lower portions $b^3$ $b^4$, and perforated intermediate portion or belt $b^5$, in combination with a strainer or coffee-holder and a pot, kettle, or boiler, substantially as and for the purpose herein described.

2. The perforated vessel, cup, or coffee-holder C, having the perforated tube $h$ and flange $i$, in combination with the vessel B and its tube $f$ and flange $j$, substantially as and for the purpose shown and described.

3. The combination of the perforated cup or vessel C, the vessel B, having the trough $l$, formed by the conical bottom and the portion $b^4$ of the sides, and the coffee pot or boiler A, substantially as and for the purposes herein described.

ARMSTRONG B. PLACE.

Witnesses:
JOHN N. AMMEN,
THOMAS LYNCH.